3,144,337
ANIMAL FEED CONTAINING STEROIDAL SAPOGENIN

John E. McKeen, Brooklyn, and Ward J. Haas, Bronxville, N.Y., assignors to Chas. Pfizer & Co., Inc., Brooklyn, N.Y., a corporation of Delaware
No Drawing. Filed Oct. 7, 1960, Ser. No. 61,080
10 Claims. (Cl. 99—2)

This invention relates to new and improved animal feeds, as well as to a method for markedly stimulating the growth of animals by the administration thereto of said feeds. More particularly, it is concerned with nutritionally-balanced animal feed compositions containing certain selected steroidal sapogenins. In addition, these feed compositions may also contain compounds possessing estrogenic activity that can be admixed with the steroidal sapogenins.

The present application is a continuation-in-part of our copending application Serial No. 785,570, filed January 8, 1959, now abandoned.

In the past, it has been reported that various antibiotic hormones and chemotherapeutic agents are useful for stimulating the growth of domestic animals, such as poultry, lambs, cattle, swine, and the like. Thus, such animals are able to attain market size sooner and on less feed. Furthermore, the incidence of disease is greatly reduced and there are few runts or subpar animals to cull out. Hence, this method has proven to be of sufficient value so that several of these aforementioned growth-promoters are widely used for agricultural purposes. In accordance with the prior art, penicillin and stilbestrol are among the more widely known agents used for stimulating the growth of poultry. It has been observed in recent years that the degree of response of poultry to these aforementioned growth-promoters is not as favorable now as it once was when much of the work in this field was originally performed. It has been speculated that this is due not to a failure of these agents to have an effect on the animals' growth, but rather that the effect is due to the absence of microorganisms in the environment of the control animals as the latter tend to suppress, to some extent, the full growth of these animals. This may be due to a greater practice of sanitary techniques in recent years and also to the continued use of antibiotic products in animal feeds.

In accordance with the present invention, it has now been found that animal feeds containing certain selected steroidal sapogenins, which are non-antibiotic materials, elicit a substantially greater growth increase and feed efficiency response in animals than when said feeds are used alone. Additionally, there is obtained a general improvement in the quality of meat that is produced by the animals which are treated in this manner. The sapogenins employed are non-toxic in nature and they are preferably selected from the group consisting of smilagenin, sarsasapogenin and hecogenin. These particular compounds are all members of a class of well-known substances that occur in nature principally in the form of their glycosides or, as they are more commonly called, saponins. Needless to say, it is to be understood that these particular saponins, viz., those from which the corresponding sapogenins of this invention are derived, can also be used as growth promoters, but that great care must be taken in their administration in view of the possible toxic nature of some of the substances involved. Hence, it is generally more advisable to use the sapogenins themselves for this particular purpose as is hereinafter described.

In accordance with a preferred embodiment of this invention, it has also been found that when an estrogenic substance is concurrently administered to an animal together with a steroidal sapogenin of the aforesaid type, there is obtained an even greater growth response than could possibly be anticipated from the use of the sapogenin and estrogenic substance alone. This completely unexpected result not only affords an increase in the rate of weight gain and an improved feed efficiency response, but also causes an increase in the quality of the meat that is produced. The estrogenic substance employed is a member of a class of chemical compounds which initiate the estrus in sexually matured normal female animals. Exemplary of these substances, which may either be of the naturally-occurring variety or commercially available via the standard methods of organic synthesis, are such compounds as diethylstilbestrol and derivatives thereof, estrone, estradiol, dianisylhexene, dienestrol, hexestrol, genistin, and the like.

In accordance with the process of this invention, a level as low at 0.1 gram of one of the aforesaid sapogenins per ton of animal feed is sufficient to impart a substantial growth response to the animal. In general, the non-toxic steroidal sapogenin can be employed in said feeds at concentration levels ranging from about 0.1 g. to about 24 g. per ton of feed in order to obtain the unusually high degree of growth promotion previously referred to. Although some effect may also be produced by using less than 0.1 gram per ton (e.g., see Example III), the results obtained are variable and it is usually not advisable to use amounts that are appreciably below the lower limit of the aforesaid range. The preferred proportion is generally one that is in the concentration range of from about 2.0 to about 10 grams per ton of feed, although this will vary to some extent depending upon the animal's weight, its individual response to said growth promoter and the particular species of animal being treated.

As previously indicated, the valuable growth stimulation of the present invention may be achieved by the oral administration of a non-toxic steroidal sapogenin and one that is preferably selected from the group consisting of smilagenin, sarsasapogenin and hecogenin. Such oral administration can be accomplished in the form of tablets, capsules, powders, solutions, suspensions or on admixture with one or more components of the animal's feed. Alternatively, it may also be administered in an equivalent amount via the animal's drinking water. The estrogenic substance, and preferably diethylstilbestrol, may be administered concurrently or separately with the sapogenin in either of the aforementioned orally administrable forms. The growth promoters of the present invention may also be administered by such other means as implantation and the like, if so desired, but it has usually been found more convenient to administer them in form of the animal's feed, i.e., on admixture therewith, in order to achieve the outstanding growth response previously referred to.

The herein described feeds of this invention have been found to be particularly valuable and outstanding in the case of such animals as hogs, swine, lambs, sheep, cattle, and the like, although it is to be understood that they are also applicable in the case of poultry. The non-toxic steroidal sapogenin may, of course, be administered in one component of the feed, as aforesaid, or it may be uniformly blended or distributed throughout a mixed feed. In this connection, it should also be noted that a wide variety of feed components may be of use in the nutritional diets of this invention. A type of conventional feed material for just such purposes and one which is often preferred in the operation of this invention is that which generally follows the suggested formulae set forth on page six of the authoritative pamphlet issued by the National Research Council (Washington, D. C., June 1944) and entitled "Recommended Nutrient Allowance for Poultry." For instance, feed compositions are recommended to contain roughly between about 50% and about 80% of grains, such as ground grain or grain by-products, molasses and other sugar by-products; between about 3% and about 10% of animal protein, such as fish meal, meat-scraps, and the like; between about 5% and about 30% of vegetable protein, such as soybean oil meal, peanut meal, cottonseed meal, and the like; and between about 2% and about 5% of minerals, such as bone meal, limestone, etc.; together with supplementary vitaminaceous sources, such as thiamine, riboflavin, niacin, etc. Furthermore, the growth-promoters of this invention may either be used in said feeds alone or in conjunction with various antibiotics and other chemotherapeutic agents, such as penicillin, chlortetracycline, oxytetracycline, tetracycline, bacitracin, sulfaquinoxaline, phenylarsonic acid, hydroxyzine, oleandomycin, etc.

In accordance with the results obtained in several of the specific embodiments of this invention, smilagenin at levels ranging from 2.0 to 24 grams per ton of feed provided an improved rate of weight gain and feed efficiency in trial lambs, with optimum results being obtained at 8 grams per ton for which the average increase in rate of gain is 24% above the corresponding control value and 19% above the average feed efficiency control value. Additionally, sarsasapogenin and hecogenin have both been found to be comparable to smilagenin in this respect when employed at the same concentration levels. Furthermore, still greater effects in growth promotion and the quality of the meat produced have been achieved by the use of the aforementioned combination of non-toxic steroidal sapogenins with an estrogenic substance. For instance, the combination of smilagenin and diethylstilbestrol at levels of 8 grams per ton and 1.25 grams per ton, respectively, proved to be particularly outstanding and effective when used for these purposes in lambs.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

Lambs were fed on a nutritious diet containing the following ingredients.

Ingredients: Parts
  Dehydrated alfalfa meal _____ 35.0
  Ground yellow corn _____ 50.0
  Urea _____ 1.0
  Bone meal _____ 1.0
  Cane molasses _____ 10.0
  Bentonite _____ 3.0

Groups of lambs, each weighing approximately 80–85 lbs., were fed this diet together with smilagenin at concentration levels of 2.0 grams per ton and 8.0 grams per ton, respectively. Another group was fed on this same diet with no smilagenin added so as to serve as a control group. The results obtained after 75 days are summarized below in the following table:

| Treatment | No. of lambs | Av. daily gain (lb.) | Percent increase | Feed per lb. gain | Carcass grade[1] |
|---|---|---|---|---|---|
| Control | 12 | 0.322 | | 9.80 | 8.58 |
| Do | 11 | 0.335 | | 9.49 | 8.64 |
| Smilagenin, 2 g./ton | 10 | 0.365 | 11.1 | 8.41 | 9.20 |
| Smilagenin, 8 g./ton | 11 | 0.379 | 15.4 | 8.17 | 9.27 |

[1] Carcass grade: medium good, 8; high good, 9; low choice, 10.

It is obvious from these results that the animals treated with smilagenin gave a greater weight gain, a greater feed efficiency and an improved carcass grade over that elicited in the untreated animals.

*Example II*

Pigs weighing approximately 120 lbs. were fed on a 14% protein ration containing meat, bone scraps and alfalfa meal in addition to mineral and vitamin supplements. One group of pigs was fed this ration alone, while other groups were fed this ration together with smilagenin at concentration levels of 0.1 gram per ton and 1.0 gram per ton, respectively. The results obtained after the animals had been raised to a weight of approximately 165 lbs. are summarized below in the following table:

| Treatment | No. of pigs | Av. daily gain (lb.) | Percent increase | Feed per lb. gain |
|---|---|---|---|---|
| Control | 9 | 1.40 | | 3.39 |
| Smilagenin, 0.1 g./ton | 9 | 1.54 | 10.0 | 3.24 |
| Smilagenin, 1.0 g./ton | 9 | 1.46 | 4.3 | 3.15 |
| Smilagenin, 10 g./ton | 9 | 1.43 | 2.2 | 3.23 |

*Example III*

Early-weaned (10 days) baby pigs were fed a nutritious diet (prepared as described in Example I) containing 50 grams per ton of oxytetracycline. Two groups of pigs were fed this same diet containing smilagenin at levels of 0.1 and 1.0 gram per ton, respectively. The results obtained are summarized below in the following table:

| Treatment | No. of pigs | Av. daily gain (lb.) | Percent increase | Feed per lb. gain |
|---|---|---|---|---|
| Control | 18 | 0.56 | | 1.99 |
| Smilagenin, 0.1 g./ton | 18 | 0.61 | 9.1 | 1.84 |
| Smilagenin, 1.0 g./ton | 18 | 0.60 | 7.2 | 1.84 |

Other baby pigs were similarly fed a nutritious diet, without the oxytetracycline. Two groups of pigs were fed this same diet together with smilagenin at levels of 0.01 gram per ton and 0.5 gram per ton of feed, respectively. The results obtained in this manner are summarized below in the following table:

| Treatment | No. of pigs | Av. daily gain (lb.) | Percent increase | Feed per lb. gain |
|---|---|---|---|---|
| Control | 24 | 0.46 | | 1.96 |
| Smilagenin, 0.01 g./ton | 24 | 0.51 | 10.9 | 1.89 |
| Smilagenin, 0.5 g./ton | 24 | 0.54 | 17.4 | 1.78 |

*Example IV*

Lambs were fed on a nutritious diet as described in Example I. One group was fed this diet together with diethylstilbestrol at a concentration level of 1.25 grams per ton of feed. A second group was fed this diet containing the same amount of diethylstilbestrol, as well as smilagenin at a concentration level of 8 grams per ton of feed. A third group was fed the untreated diet and served as a control. The results obtained after 56 days of treatment are summarized below in the following table:

| Treatment | No. of lambs | Av. daily gain (lb.) | Percent increase | Feed per lb. gain |
|---|---|---|---|---|
| Control | 24 | 0.368 | | 6.84 |
| Smilagenin, 8.0 g./ton | 12 | 0.390 | 5.8 | 6.23 |
| Diethylstilbestrol, 1.25 g./ton | 12 | 0.432 | 17.4 | 6.13 |
| Diethylstilbestrol, 1.25 g./ton and smilagenin, 8.0 g./ton | 12 | 0.534 | 45.1 | 5.25 |

It is obvious from these results that the combination of diethylstilbestrol and smilagenin gives an outstanding increase in daily weight gains and a higher efficiency in the conversion of feed to body weight as evidenced by the feed/gain ratio. Similar results are also obtained when employing other estrogenic substances in place of diethylstilbestrol.

Example V

Lambs were fed on a nutritious diet having the following composition.

Ingredients: Parts
- Sun-cured alfalfa meal (13%) _____ 35.0
- Cane molasses _____ 7.0
- Ground yellow corn _____ 53.5
- Urea _____ 1.0
- Bone meal _____ 1.0
- Bentonite _____ 2.5

Groups of lambs were then fed this diet together with sarsasapogenin at a concentration level of 8 grams per ton of feed. A similar run was made with smilagenin for comparison purposes. The results obtained in both cases after 68 days of treatment are summarized below in the following table:

| Treatment | No. of lambs | Av. daily gain (lb.) | Percent increase | Feed per lb. gain | Carcass grade[1] |
|---|---|---|---|---|---|
| Control | 12 | 0.314 | | 9.68 | 7.27 |
| Do | 12 | 0.326 | | 8.90 | 6.40 |
| Smilagenin, 8 g./ton | 12 | 0.430 | 34.4 | 7.69 | 7.67 |
| Sarsasapogenin, 8 g./ton | 12 | 0.428 | 33.8 | 8.29 | 7.50 |

[1] Carcas grade: medium good, 8; high good, 9; low choice, 10.

From the above table, it is obvious that sarsasapogenin affords substantially the same results as does smilagenin in every respect.

Example VI

Groups of lambs were fed the same nutritious diet as described in the previous example, together with hecogenin at a concentration level of 8 grams per ton of feed. The results obtained after 70 days of treatment are presented below in the following table, employing an average of two replicate tests for the control values:

| Treatment | No. of lambs | Av. daily gain (lb.) | Percent increase | Feed per lb. gain |
|---|---|---|---|---|
| Control | 12 | 0.392 | | 7.38 |
| Hecogenin, 8 g./ton | 12 | 0.429 | 9.4 | 7.23 |

On the basis of the above results, it is obvious that hecogenin is effective in improving weight gains and feed efficiency in lambs beyond that obtained in the case of the control animals, i.e., the untreated animals.

What is claimed is:

1. An animal feed composition comprising a nutritionally-balanced animal feed and a growth-promoting amount of a non-toxic steroidal sapogenin.

2. An animal feed composition as claimed in claim 1 wherein the steroidal sapogenin is selected from the group consisting of smilagenin, sarsasapogenin and hecogenin.

3. An animal feed composition as claimed in claim 1 having a minor portion of an estrogenic substance uniformly distributed therein.

4. An animal feed composition comprising a nutritionally-balanced animal feed and as the essential active ingredient from about 0.1 g. to about 24 g. of a non-toxic steroidal sapogenin per ton of said animal feed.

5. An animal feed composition comprising a nutritionally-balanced animal feed and as the essential active ingredient from about 0.1 g. to about 25 g. of a steroidal sapogenin per ton of said feed, said steroidal sapogenin being selected from the group consisting of smilagenin, sarsasapogenin and hecogenin.

6. An animal feed composition as claimed in claim 5 wherein the steroidal sapogenin is smilagenin.

7. An animal feed composition as claimed in claim 5 wherein the steroidal sapogenin is sarsasapogenin.

8. An animal feed composition as claimed in claim 5 wherein the steroidal sapogenin is hecogenin.

9. A process for increasing growth in animals, which comprises the step of administering to said animals a growth-promoting amount of a non-toxic steroidal sapogenin.

10. A process as claimed in claim 9 wherein the steroidal sapogenin is fed to said animals.

References Cited in the file of this patent

UNITED STATES PATENTS

| 2,780,620 | Krider et al. | Feb. 5, 1957 |
| 2,951,759 | De Zeeuw et al. | Sept. 6, 1960 |

OTHER REFERENCES

Feedstuffs, May 14, 1960, pages 1 and 101 99–2–H.